(12) United States Patent
Luo et al.

(10) Patent No.: US 10,682,619 B2
(45) Date of Patent: Jun. 16, 2020

(54) NANO-SILICA DISPERSION HAVING AMPHIPHILIC PROPERTIES AND A DOUBLE-PARTICLE STRUCTURE AND ITS PRODUCTION METHOD

(71) Applicant: PetroChina Company Limited, Beijing (CN)

(72) Inventors: Jianhui Luo, Beijing (CN); Bo Jiang, Beijing (CN); Lipeng He, Beijing (CN); Pingmei Wang, Beijing (CN); Baoliang Peng, Beijing (CN); Jie Yang, Beijing (CN); Bin Ding, Beijing (CN); Yuanyang Li, Beijing (CN); Xiangfei Geng, Beijing (CN)

(73) Assignee: PetroChina Company Limited, Beijing (CN)

( * ) Notice: Subject to any disclaimer, the term of this patent is extended or adjusted under 35 U.S.C. 154(b) by 130 days.

(21) Appl. No.: 15/941,712

(22) Filed: Mar. 30, 2018

(65) Prior Publication Data

US 2019/0046939 A1 Feb. 14, 2019

(30) Foreign Application Priority Data

Aug. 9, 2017 (CN) .......................... 2017 1 06747394

(51) Int. Cl.
*B32B 5/16* (2006.01)
*B01F 17/54* (2006.01)
*B01F 17/00* (2006.01)

(52) U.S. Cl.
CPC ...... *B01F 17/0071* (2013.01); *B01F 17/0007* (2013.01)

(58) Field of Classification Search
CPC ..... C08F 8/00; C09C 1/28; C09C 1/30; C09C 1/3081

(Continued)

(56) References Cited

U.S. PATENT DOCUMENTS

2006/0286305 A1 12/2006 Thies et al.

FOREIGN PATENT DOCUMENTS

| CN | 101225249 A | * 7/2008 |
| CN | 101428807 A | 5/2009 |

(Continued)

OTHER PUBLICATIONS

Linden, Chalmers U. of Tech., Surface modified silica nanoparticles as emulsifier, Master of Science Thesis in the Master Degree Programme Materials and Nanotechnology (Year: 2012).*

(Continued)

*Primary Examiner* — Hoa (Holly) Le
(74) *Attorney, Agent, or Firm* — Hamilton, Brook, Smith & Reynolds, P.C.

(57) ABSTRACT

The present invention provides a nano-silica dispersion having amphiphilic properties and a double-particle structure and its production method. The production method comprises: producing a lipophilically modified nano-silica alcosol which is denoted as a first reaction solution by adding a silane coupling agent containing a lipophilic group to a nano-silica alcosol as a raw material; producing a hydrophilically modified nano-silica alcosol which is denoted as a second reaction solution by adding a silane coupling agent containing a hydrophilic group into a nano-silica alcosol as a raw material; producing the nano-silica dispersion having amphiphilic properties and a double-particle structure by adding 3-aminopropyltriethoxysilane to the first reaction solution, stirring, then mixing the resultant with the second reaction solution. The present invention further provides a nano-silica dispersion having amphiphilic properties and a double-particle structure produced by the above production method. It has both hydrophilic and lipophilic properties, and has the double-particle structure, with (Continued)

a particle size of less than 100 nm. The production process is simple and low in cost.

20 Claims, 1 Drawing Sheet

(58) Field of Classification Search
USPC .................................................. 428/403–406
See application file for complete search history.

(56) References Cited

FOREIGN PATENT DOCUMENTS

| CN | 101659415 A | 3/2010 |
|----|-------------|--------|
| CN | 101792147 A | 8/2010 |
| CN | 101914190 A | 12/2010 |
| CN | 102616794 A | 8/2012 |

OTHER PUBLICATIONS

Google translation CN-101914190 B (2010) (Year: 2010).*
Barry Arkles | Gelest Inc., Hydrophobicity, Hydrophilicity and Silanes, 2006 (Year: 2006).*
Li et al, A Novel Method of Preparation of Superhydrophobic Nanosilica in Aqueous Solution, Chemistry Letters vol. 35, No. 1 (2006) (Year: 2006).*
Zhang, J., et al., "Surface-Initiated Free Radical Polymerization at the Liquid-Liquid Interface: A One-Step Approach for the Synthesis of Amphiphilic Janus Silica Particles", Langmuir 2009, 25(1): 6431-6437.
Wang, H., et al., "Synthesis and Applications of Amphiphilic Silica Nanoparticles", Materials Review, Nov. 2011, 25: 4 pages.
Hong, L., et al., "Simple Method to Produce Janus Colloidal Particles in Large Quanity", Langmuir 2006, 22, 9495-9499.

* cited by examiner

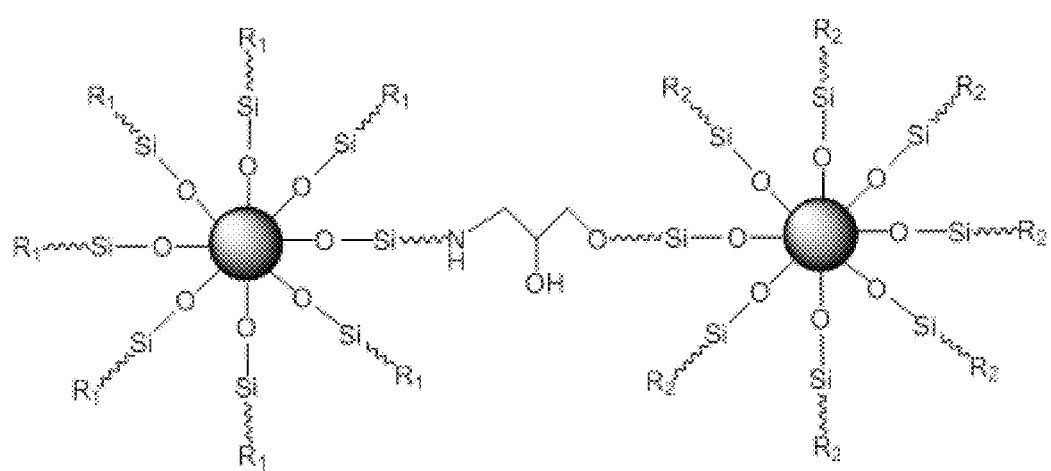

NANO-SILICA DISPERSION HAVING AMPHIPHILIC PROPERTIES AND A DOUBLE-PARTICLE STRUCTURE AND ITS PRODUCTION METHOD

RELATED APPLICATION

This application claims priority under 35 U.S.C. § 119 or 365 to Chinese Application No.: 2017106747394, filed Aug. 9, 2017. The entire teachings of the above application(s) are incorporated herein by reference.

FIELD OF TECHNOLOGY

The invention relates to a production method of nano-silica dispersion, in particular to a production method of a nano-silica dispersion which has both hydrophilic and lipophilic properties and has a double-particle structure, which pertains to the technical field of nano-material production.

BACKGROUND ART

Janus particles refer to a kind of anisotropic particles two hemispherical surfaces of which have different chemical properties. Janus particles have special structures, excellent properties, and broad application prospects. Amphiphilic nano-particles are chemically asymmetrical at both ends and are therefore one of the Janus particles. The methods for producing amphiphilic Janus particles fall into four main categories: selective surface modification, template-directed self-assembly, the use of phase separation, and control of surface nucleation.

Silica raw materials are readily available and inexpensive, making them ideal starting materials for amphiphilic Janus particles. When amphiphilic Janus particles are produced using silica particles as precursor particles, a selective surface modification method is often used. For example, with homogeneous silica beads as precursor particles, the silica particles are dispersed at a paraffin-water interface at a higher temperature, and then the temperature is lowered to solidify the paraffin. The silica particles are thus immobilized on the solidified paraffin-water interface to form small solid paraffin droplets which are then chemically modified on the side which is not covered by paraffin. Subsequently, the paraffin is dissolved in an organic solvent, and the resulting particles can be further chemically modified (Liang H., Langmuir 2006, 22, 9495-9499). In addition, free-radical polymerization can also be initiated through the surface of the liquid-liquid interface. Amphiphilic silica particles were produced by grafting hydrophobic polystyrene and hydrophilic poly(methyl acrylate) on the respective hemisphere of silica (Zhang J., Langmuir 2009, 25 (11), 6431-6437). However, the amphiphilic nano-silica produced by such method has a particle size larger than 100 nm, and the process is complex with small amount produced each time, expensive and difficult to large-scale application.

Due to the large amount of hydroxyl groups on the surface of nano-silica particles, the silica particles have strong hydrophilic properties per se. In addition, the hydroxyl groups on the surface of nano-silica particles easily interact with functional groups such as amino groups and hydroxyl groups to modify the hydrophilicity and hydrophobicity of the surface of the particles through chemical modification. Therefore, in the preparation of amphiphilic nano-silica, the surface of nano-silica can be partially hydrophobized to arrange dispersively the hydrophilic and hydrophobic groups on the surface of silica. Therefore, nano-silica can exhibit some amphiphilic properties. Chinese patent application CN101792147B describes the surfaces of silica particles having a particle size of 100-800 nm are chemically modified with phenyltrimethoxysilane, (4-chlorophenyl)triethoxysilane, (4-chlorophenyl)trichlorosilane or 4-chloromethylphenyltrichlorosilane to change the hydrophilicity and hydrophobicity of the particles, in order to produce amphiphilic silica particles. Chinese patent application CN101428807A uses titanate coupling agents for in-situ modification of nano-silica particles. Organic groups are attached to the nano-silica surface to reduce the number of hydroxyl groups on the surface of the particles and thus reduce the surface energy, to obtain easily dispersible amphiphilic nano-silica. Chinese patent application CN101659415A adopts the same strategy by introducing multi-functional silane coupling agent to modify the silica particles in situ to reduce the surface energy of the particles, so that a nano-dispersion of silica is produced by the subsequent combined dispersion techniques.

However, the amphiphilic nano-silica produced by the above prior art method is subjected to both hydrophilic and lipophilic modifications based on one particle. These two kinds of modification will interact with each other, which limits the types of hydrophilic or lipophilic groups on the particle surface. The number of surface hydrophilic and lipophilic groups cannot be adjusted independently, thereby limiting the adjustment of hydrophilic and lipophilic properties of the amphiphilic nano-silica. Thus the amphiphilic nano-silica particles themselves are not strongly hydrophilic and lipophilic. Also, the existing preparation technique for amphiphilic nano-silica cannot provide amphiphilic nano-silica having a particle size of less than 100 nm. Moreover, the inherent complexity and high cost of the process make it difficult to independently adjust the hydrophilic and lipophilic properties of amphiphilic nano-silica.

SUMMARY OF THE INVENTION

In order to solve the above technical problem, an object of the present invention is to provide a method for producing nano-silica having a particle size of less than 100 nm, which has both hydrophilic and lipophilic properties and has a double-particle structure.

To achieve the above object, the present invention provides a method for producing a nano-silica dispersion having amphiphilic properties and a double-particle structure, comprising:

a step of producing a lipophilically modified nano-silica alcosol which is denoted as a first reaction solution by adding a silane coupling agent containing a lipophilic group to a nano-silica alcosol as a raw material;

a step of producing a hydrophilically modified nano-silica alcosol which is denoted as a second reaction solution by adding a silane coupling agent containing a hydrophilic group into a nano-silica alcosol as a raw material;

a step of producing the nano-silica dispersion having amphiphilic properties and a double-particle structure by adding 3-aminopropyltriethoxysilane to the first reaction solution at 30° C. to 45° C., stirring for 3 h to 6 h, then mixing the resultant with the second reaction solution in a mass ratio of 1:1, and stirring for 0.5 h to 3 h; wherein, the mass ratio of 3-aminopropyltriethoxysilane to silica in the first reaction solution is 1:20,000 to 1:50,000.

In the method for producing a nano-silica dispersion having amphiphilic properties and a double-particle structure according to the present invention, preferably, the production of the lipophilically modified nano-silica alcosol comprises:

a step of heating the nano-silica alcosol to 30° C. to 45° C., adding the silane coupling agent containing a lipophilic group in an amount of 25% to 100% by mass based on the nano-silica, stirring for 2 h to 5 h, and aging for 3 d to 7 d, to produce the lipophilically modified nano-silica alcosol.

In the method for producing a nano-silica dispersion having amphiphilic properties and a double-particle structure according to the present invention, preferably, the production of the hydrophilically modified nano-silica alcosol comprises:

a step of heating the nano-silica alcosol to 30° C. to 45° C., adding the silane coupling agent containing a hydrophilic group in an amount of 25% to 100% by mass based on the nano-silica, stirring for 2 h to 5 h, and aging for 3 d to 7 d, to produce the hydrophilically modified nano-silica alcosol.

In the method for producing a nano-silica dispersion having amphiphilic properties and a double-particle structure according to the present invention, preferably, the nano-silica alcosol used has a concentration of 1 wt % to 10 wt %.

In the method for producing a nano-silica dispersion having amphiphilic properties and a double-particle structure according to the present invention, the nano-silica alcosol used is produced by a conventional sol-gel method in the art, preferably, is produced by using an alcohol as a solvent and ethyl orthosilicate (TEOS) as a precursor, under the action of a basic catalyst (aqueous ammonia), wherein the mass ratio of alcohol:TEOS:water:ammonia is (30-50):(3-7):1:(0.15-0.4), and the reaction temperature is 20° C. to 40° C.

In the process, the concentration of silica alcosol as well as particle size, distribution, particle surface morphology, specific surface area and the like are controlled by controlling the type and amount of catalyst, the ratio of TEOS to water, temperature and other reaction conditions.

In the method for producing a nano-silica dispersion having amphiphilic properties and a double-particle structure according to the present invention, preferably, the alcohol used is one or more of ethanol, propanol and butanol.

In the method for producing a nano-silica dispersion having amphiphilic properties and a double-particle structure according to the present invention, preferably, the silane coupling agent containing a lipophilic group used is a silane coupling agent containing a C8-C16 alkyl chain or a benzene-based group.

In the method for producing a nano-silica dispersion having amphiphilic properties and a double-particle structure according to the present invention, preferably, the benzene-based group used is a group of alkylphenol polyoxyethylene ether or a polyhydroxy benzene.

In the method for producing a nano-silica dispersion having amphiphilic properties and a double-particle structure according to the present invention, preferably, the silane coupling agent containing a lipophilic group used comprises one or more of n-octyltrimethoxysilane, dodecyltrimethoxysilane, cetyltrimethoxysilane, diphenyldimethoxysilane, methylphenyldimethoxysilane and hexamethyldisilazane.

In the method for producing a nano-silica dispersion having amphiphilic properties and a double-particle structure according to the present invention, preferably, the silane coupling agent containing a hydrophilic group used is a silane coupling agent containing a polyhydroxy group or a group that can be converted to a polyhydroxy group.

In the method for producing a nano-silica dispersion having amphiphilic properties and a double-particle structure according to the present invention, preferably, the silane coupling agent containing a hydrophilic group used is γ-glycidyl oxypropyltrimethoxysilane (manufactured from Daoning Chemical Co., Ltd., Nanjing, China).

In the method for producing a nano-silica dispersion having amphiphilic properties and a double-particle structure according to the present invention, preferably, the lipophilic nano-silica particles in the obtained lipophilically modified nano-silica alcosol have a particle size of 5 nm to 100 nm.

In the method for producing a nano-silica dispersion having amphiphilic properties and a double-particle structure according to the present invention, preferably, the hydrophilic nano-silica particles in the obtained hydrophilically modified nano-silica alcosol have a particle size of 5 nm to 100 nm.

The present invention further provides a nano-silica dispersion having amphiphilic properties and a double-particle structure, which is produced by the above method for producing a nano-silica dispersion having amphiphilic properties and a double-particle structure.

In the nano-silica dispersion having amphiphilic properties and a double-particle structure according to the present invention, preferably, the nano-silica particles in the nano-silica dispersion having amphiphilic properties and a double-particle structure have a particle size of 10 nm to 100 nm.

In the method for producing a nano-silica dispersion having amphiphilic properties and a double-particle structure according to the present invention, hydrophilically modified nano-silica particles and lipophilically modified nano-silica particles are covalently coupled to produce the nano-silica dispersion having amphiphilic properties and a double-particle structure. The produced nano-silica dispersion having amphiphilic properties and a double-particle structure has both hydrophilic and lipophilic properties, and has the double-particle structure.

In the method for producing a nano-silica dispersion having amphiphilic properties and a double-particle structure according to the present invention, a nano-silica alcosol produced by a sol-gel method is used as a raw material, and the particle size of the nano-silica can be controlled at 10 nm-100 nm, rendering the production method simple in operation and low in cost. The produced silica particles have a large specific surface area due to their small particle size. By increasing the surface area, it is possible to increase the number of active sites on the surface that can be hydrophilically or lipophilically modified, which is advantageous for the amphiphilic performance optimization of amphiphilic silica.

Both the modification step and the production process in the method for producing a nano-silica dispersion having amphiphilic properties and a double-particle structure according to the present invention are carried out in an alcohol solution. There is no need to additionally add an alcohol solution in the production process, and the agglomeration problem of the nano-particles does not occur. The produced amphiphilic nano-silica dispersion has stable performance and is suitable for large-scale industrial manufacture and application.

In the method for producing a nano-silica dispersion having amphiphilic properties and a double-particle structure according to the present invention, lipophilic nano-silica particles and hydrophilic nano-silica particles are covalently coupled to produce the nano-silica dispersion having amphiphilic properties and a double-particle structure, and the produced dispersion shows strong synergistic effect and special interfacial properties at the oil-water interface.

An amphiphilic nano-silica having a double-particle structure is obtained by the method for producing a nano-silica dispersion having amphiphilic properties and a double-particle structure according to the present invention. Hydrophilic and lipophilic modifications of the silica particles are carried out separately on two particles. After modifications, the two particles self-assemble to form an amphiphilic nano-silica having a double-particle structure through coupling of chemical bonds. The preparation method according to the present invention can realize the individual regulation of the type or amount of the hydrophilic and lipophilic groups on the surface of particles so as to optimize the proportion thereof, and thus the produced amphiphilic nano-silica having a double-particle structure has good amphiphilic properties.

In the method for producing a nano-silica dispersion having amphiphilic properties and a double-particle structure according to the present invention, the silica particles are subjected to hydrophilic and lipophilic modifications separately. After modifications, the self-assembly occurs to form an amphiphilic nano-silica having a double-particle structure through coupling of chemical bonds. Thus, the hydrophilic and lipophilic modifications of the particles do not interfere with each other, which allow directional distribution of the hydrophilic or lipophilic groups on the surface of the silica particles, thus allowing fine control of the type and grafting amount of hydrophilic or lipophilic groups, respectively. Therefore, fine control of the hydrophilic or lipophilic properties of nano-silica can be realized, which greatly improve the chemical properties of the amphiphilic nano-silica particles.

BRIEF DESCRIPTION OF THE DRAWING

The FIGURE is a structural view of a nano-silica sphere in the nano-silica dispersion having amphiphilic properties and a double-particle structure according to Example 1.

DETAILED DESCRIPTION OF PREFERRED EMBODIMENTS

Now the technical solutions of the present invention are described in detail, in order to understand the technical features, the objectives and the beneficial effects of the present invention more clearly, but it should not be construed as limiting the scope of the present invention.

The silica alcosol used in the following examples is a silica-ethanol sol produced by a sol-gel method, specifically comprising the following steps:

164.4 g of TEOS (silicon precursor), 1385.2 g of absolute ethanol (solvent), 40 g of water (solvent) and 8.7 g of aqueous ammonia (catalyst) were added to a beaker and magnetically stirred at 30° C. for 2 h. After the reaction was completed, the sol was allowed to be aged in a constant temperature water bath at 25° C. for 7 days and refluxed to remove the ammonia in the sol, to finally obtain the silica-ethanol sol to be modified.

Example 1

This example provides a nano-silica dispersion having amphiphilic properties and a double-particle structure produced by the following steps:

Step 1: 100 g of silica-ethanol sol with a concentration of 3 wt % was added to a glass reagent bottle at a controlled temperature of 30° C., and 3 g of methylphenyldimethoxysilane was added in terms of 100% by mass of nano-silica, stirred at 30° C. for 2 h and aged at 30° C. for 3 d, to obtain a lipophilically modified silica-ethanol sol having a particle size of 18 nm;

Step 2: 100 g of silica-ethanol sol with a concentration of 3 wt % was added to a glass reagent bottle at a controlled temperature of 30° C., and 3 g of γ-glycidyl oxypropyltrimethoxysilane was added in terms of 100% by mass of nano-silica, stirred at 30° C. for 2 h and aged at 30° C. for 3 d, to obtain a hydrophilically modified silica-ethanol sol having a particle size of 15 nm;

Step 3: 150 μg of 3-aminopropyltriethoxysilane was added (at a mass ratio of 1:20000 to nano-silica in Step 1) to the lipophilically modified silica-ethanol sol in Step 1, and stirred at 30° C. for 6 h; subsequently, the hydrophilically modified silica-ethanol sol produced in Step 2 was added and continued to stirring at 30° C. for 0.5 h, to obtain the nano-silica dispersion having amphiphilic properties and a double-particle structure, of which structure is shown in the FIGURE with a particle size of 29 nm.

The particle size of amphiphilic nano-silica approximates the sum of the particle sizes of lipophilic nano-silica and hydrophilic nano-silica, whereas the particle size of a physically mixed sample of the lipophilic and hydrophilic nano-silica is close to that of lipophilic nano-silica or hydrophilic nano-silica alone under the same conditions, indicating that the lipophilic nano-silica and hydrophilic nano-silica particles self-assemble to form an amphiphilic nano-silica having a double-particle structure through the coupling of chemical bonds.

Example 2

This example provides a nano-silica dispersion having amphiphilic properties and a double-particle structure produced by the following steps:

Step 1: 100 g of silica-ethanol sol with a concentration of 10 wt % was added to a glass reagent bottle at a controlled temperature of 45° C., and 10 g of cetyltrimethoxysilane was added in terms of 100% by mass of nano-silica, stirred at 45° C. for 5 h and aged for 7 d, to obtain a lipophilically modified silica sol having a particle size of 47 nm;

Step 2: 100 g of silica-ethanol sol with a concentration of 10 wt % was added to a glass reagent bottle at a controlled temperature of 45° C., and 10 g of γ-glycidyl oxypropyltrimethoxysilane was added in terms of 100% by mass of nano-silica, stirred at 45° C. for 5 h and aged at 45° C. for 7 d, to obtain a hydrophilically modified silica sol having a particle size of 55 nm;

Step 3: 200 μg of 3-aminopropyltriethoxysilane was added (at a mass ratio of 1:50000 to nano-silica in Step 1) to the lipophilically modified silica-ethanol sol in Step 1, and stirred at 45° C. for 5 h; subsequently, the hydrophilically modified silica-ethanol sol produced in Step 2 was added and continued to stirring at 45° C. for 2 h, to obtain the nano-silica dispersion having amphiphilic properties and a double-particle structure with a particle size of 96 nm.

Example 3

This example provides a nano-silica dispersion having amphiphilic properties and a double-particle structure produced by the following steps:

Step 1: 100 g of silica-ethanol sol with a concentration of 10 wt % was added to a glass reagent bottle at a controlled temperature of 40° C., and 5 g of diphenyldimethoxysilane was added in terms of 50% by mass of nano-silica, stirred at 40° C. for 3 h and aged at 40° C. for 5 d, to obtain a lipophilically modified silica sol having a particle size of 38 nm;

Step 2: 100 g of silica-ethanol sol with a concentration of 10 wt % was added to a glass reagent bottle at a controlled temperature of 40° C., and 5 g of γ-glycidyl oxypropyltrimethoxysilane was added in terms of 50% by mass of nano-silica, stirred at 40° C. for 3 h and aged at 40° C. for 5 d, to obtain a hydrophilically modified silica sol having a particle size of 47 nm;

Step 3: 250 μg of 3-aminopropyltriethoxysilane was added (at a mass ratio of 1:40000 to nano-silica in Step 1) to the lipophilically modified silica-ethanol sol in Step 1, and stirred at 40° C. for 6 h; subsequently, the hydrophilically modified silica-ethanol sol produced in Step 2 was added and continued to stirring at 40° C. for 3 h, to obtain the nano-silica dispersion having amphiphilic properties and a double-particle structure with a particle size of 81 nm.

Example 4

This example provides a nano-silica dispersion having amphiphilic properties and a double-particle structure produced by the following steps:

Step 1: 100 g of silica-ethanol sol with a concentration of 5 wt % was added to a glass reagent bottle at a controlled temperature of 35° C., and 1.25 g of methylphenyldimethoxysilane was added in terms of 25% by mass of nano-silica, stirred at 35° C. for 4 h and aged at 30° C. for 4 d, to obtain a lipophilically modified silica sol having a particle size of 26 nm;

Step 2: 100 g of silica-ethanol sol with a concentration of 5 wt % was added to a glass reagent bottle at a controlled temperature of 35° C., and 1.25 g of γ-glycidyl oxypropyltrimethoxysilane was added in terms of 25% by mass of nano-silica, stirred at 30° C. for 4 h and aged at 35° C. for 4 d, to obtain a hydrophilically modified silica sol having a particle size of 28 nm;

Step 3: 250 μg of 3-aminopropyltriethoxysilane was added (at a mass ratio of 1:20000 to nano-silica in Step 1) to the lipophilically modified silica-ethanol sol in Step 1, and stirred at 35° C. for 5 h; subsequently, the hydrophilically modified silica-ethanol sol produced in Step 2 was added and continued to stirring at 35° C. for 2.5 h, to obtain the nano-silica dispersion having amphiphilic properties and a double-particle structure with a particle size of 49 nm.

Example 5

The emulsifying properties of the nano-silica dispersion having amphiphilic properties and a double-particle structure in the above Example 1 is evaluated in this example.

The double-particle nano-silica dispersion (0.05 g) was added to a mixture of water (5 mL) and cyclohexane (5 mL) and stirred at room temperature for 1.5 h. The formed emulsion layer was observed and evaluated in terms of its ability to stabilize the emulsion.

Under the same conditions, emulsion systems stabilized by a hydrophilically modified silica, a lipophilically modified silica and a physically mixed sample of hydrophilic and lipophilic silica were produced.

The results showed that in the mixed system of water and toluene, after the lipophilically modified silica, the hydrophilically modified silica and the physically mixed sample of hydrophilic and lipophilic silica were added respectively, water and toluene could not form emulsion. However, water and toluene can form a stable oil-in-water emulsion after the amphiphilic nano-silica sample produced in Example 1 was added, indicating that the amphiphilic nano-silica has a better property to stabilize the emulsion than those of the hydrophilically modified silica, the lipophilically modified silica and the physically mixed sample of hydrophilic and lipophilic silica. The amphiphilic nano-silica exhibits a strong synergistic effect and a special interfacial performance at the oil-water interface.

The above examples illustrate that, in the nano-silica dispersion having amphiphilic properties and a double-particle structure produced by the method for producing the nano-silica dispersion having amphiphilic properties and a double-particle structure according to the present invention, the amphiphilic double-particle nano-silica particles as a dispersoid have a particle size of 100 nm or less, can be stably dispersed and exhibit a strong synergistic effect and a special interfacial performance at the oil-water interface. The production method is simple to operate, low in cost, free of agglomeration problem of nanoparticles, and is suitable for large-scale industrial production and application.

The invention claimed is:

1. A method for producing a nano-silica dispersion having amphiphilic properties and a double-particle structure, the method comprises:
    producing a lipophilically modified nano-silica alcosol which is denoted as a first reaction solution by adding a silane coupling agent containing a lipophilic group to a nano-silica alcosol as a raw material;
    producing a hydrophilically modified nano-silica alcosol which is denoted as a second reaction solution by adding a silane coupling agent containing a hydrophilic group into a nano-silica alcosol as a raw material; and
    producing the nano-silica dispersion having amphiphilic properties and a double-particle structure by adding 3-aminopropyltriethoxysilane to the first reaction solution at 30° C. to 45° C., stirring for 3 h to 6 h, then mixing the resultant with the second reaction solution in a mass ratio of 1:1, and stirring for 0.5 h to 3 h;
    wherein, the mass ratio of 3-aminopropyltriethoxysilane to silica in the first reaction solution is 1:20,000 to 1:50,000.

2. The method according to claim 1, wherein the production of the lipophilically modified nano-silica alcosol comprises:
    heating the nano-silica alcosol to 30° C. to 45° C., adding the silane coupling agent containing a lipophilic group in an amount of 25% to 100% by mass based on the nano-silica, stirring for 2 h to 5 h, and aging for 3 d to 7 d, to produce the lipophilically modified nano-silica alcosol.

3. The method according to claim 1, wherein the production of the hydrophilically modified nano-silica alcosol comprises:
    heating the nano-silica alcosol to 30° C. to 45° C., adding the silane coupling agent containing a hydrophilic group in an amount of 25% to 100% by mass based on the nano-silica, stirring for 2 h to 5 h, and aging for 3 d to 7 d, to produce the hydrophilically modified nano-silica alcosol.

4. The method according to claim 1, wherein the nano-silica alcosol has a concentration of 1 wt % to 10 wt %.

5. The method according to claim 4, wherein the nano-silica alcosol is produced by using an alcohol as a solvent and ethyl orthosilicate as a precursor, under the action of a basic catalyst.

6. The method according to claim 5, wherein the alcohol is one or more of ethanol, propanol and butanol.

7. The method according to claim 1, wherein the nano-silica alcosol is produced by using an alcohol as a solvent and ethyl orthosilicate as a precursor, under the action of a basic catalyst.

8. The method according to claim 7, wherein the alcohol is one or more of ethanol, propanol and butanol.

9. The method according to claim 1, wherein the silane coupling agent containing a lipophilic group is a silane coupling agent containing a C8-C16 alkyl chain or a benzene-based group.

10. The method according to claim 9, wherein the benzene-based group is a group of alkylphenol polyoxyethylene ether or a polyhydroxy benzene.

11. The method according to claim 9, wherein the silane coupling agent containing a lipophilic group comprises one or more of n-octyltrimethoxysilane, dodecyltrimethoxysilane, cetyltrimethoxysilane, diphenyldimethoxysilane, methylphenyldimethoxysilane and hexamethyldisilazane.

12. The method according to claim 1, wherein the silane coupling agent containing a lipophilic group comprises one or more of n-octyltrimethoxysilane, dodecyltrimethoxysilane, cetyltrimethoxysilane, diphenyldimethoxysilane, methylphenyldimethoxysilane and hexamethyldisilazane.

13. The method according to claim 1, wherein the silane coupling agent containing a hydrophilic group is a silane coupling agent containing a polyhydroxy group or a group that can be converted to a polyhydroxy group.

14. The method according to claim 13, wherein the silane coupling agent containing a hydrophilic group is γ-glycidyl oxypropyltrimethoxysilane.

15. The method according to claim 1, wherein the silane coupling agent containing a hydrophilic group is γ-glycidyl oxypropyltrimethoxysilane.

16. The method according to claim 1, wherein the lipophilic nano-silica particles in the lipophilically modified nano-silica alcosol have a particle size of 5 nm to 100 nm; and the hydrophilic nano-silica particles in the hydrophilically modified nano-silica alcosol have a particle size of 5 nm to 100 nm.

17. A nano-silica dispersion having amphiphilic properties and a double-particle structure produced by the method according to claim 1, wherein one nano-silica particle in the double-particle structure is a nano-silica containing the lipophilic group, and the other nano-silica particle in the double-particle structure is a nano-silica containing the hydrophilic group.

18. The nano-silica dispersion having amphiphilic properties and a double-particle structure according to claim 17, wherein the nano-silica particles have a particle size of 10 nm to 100 nm.

19. A method for producing a nano-silica dispersion having amphiphilic properties and a double-particle structure, the method comprises:

producing a lipophilically modified nano-silica alcosol which is denoted as a first reaction solution by adding a silane coupling agent containing a lipophilic group to a nano-silica alcosol as a raw material;

producing a hydrophilically modified nano-silica alcosol which is denoted as a second reaction solution by adding a silane coupling agent containing a hydrophilic group into a nano-silica alcosol as a raw material; and producing the nano-silica dispersion having amphiphilic properties and a double-particle structure by stirring in 3-aminopropyltriethoxysilane to the first reaction solution, then mixing the resultant with the second reaction solution.

20. A nano-silica dispersion having amphiphilic properties and a double-particle structure produced by the method according to claim 19, wherein one nano-silica particle in the double-particle structure is a nano-silica containing the lipophilic group, and the other nano-silica particle in the double-particle structure is a nano-silica containing the hydrophilic group.

* * * * *